(12) United States Patent
Sekizawa et al.

(10) Patent No.: US 6,239,789 B1
(45) Date of Patent: May 29, 2001

(54) POSITION DETECTING METHOD AND APPARATUS FOR DETECTING A PLURALITY OF POSITION INDICATORS

(75) Inventors: Yasushi Sekizawa; Yuji Katsurahira, both of Saitama-Ken (JP)

(73) Assignee: Wacom Co., Ltd., Saitama-Ken (JP)

( * ) Notice: Subject to any disclaimer, the term of this patent is extended or adjusted under 35 U.S.C. 154(b) by 0 days.

(21) Appl. No.: 09/152,259

(22) Filed: Sep. 14, 1998

(30) Foreign Application Priority Data

Nov. 4, 1997 (JP) .................................................. 9-316626

(51) Int. Cl.⁷ ....................................................... G09G 5/00
(52) U.S. Cl. .......................... 345/173; 345/173; 345/174; 345/175; 345/176; 345/177
(58) Field of Search ..................................... 345/173, 174, 345/175, 176, 177

(56) References Cited

U.S. PATENT DOCUMENTS 5,466,896 * 11/1995 Murakami et al. ..................... 178/18
5,691,511 * 11/1997 Masushima et al. ................... 178/18
5,943,044 * 8/1999 Martinelli et al. .................... 345/174

* cited by examiner

*Primary Examiner*—Richard Hjerpe
*Assistant Examiner*—Jean Lesperance
(74) *Attorney, Agent, or Firm*—Finnegan, Henderson, Farabow, Garrett & Dunner, L.L.P.

(57) ABSTRACT

A method and apparatus for detecting the positions of a plurality of position indicators using a tablet or the like. After a first position indicator has been detected by an all-scan step, sensor coils to be scanned are specified according to the positional information of the first position indicator. A sector-scan step then performs a more detailed detection of the position of the first position indicator. The sector-scan step and the all-scan step for detecting the approximate position of a second position indicator are implemented alternately. The sector-scan is carried out more frequently than the all-scan.

37 Claims, 9 Drawing Sheets

POSITION DETECTING METHOD AND APPARATUS FOR DETECTING A PLURALITY OF POSITION INDICATORS

BACKGROUND OF THE INVENTION

1. Field of the Invention

The present invention relates to a position detecting method and apparatus in a position detector such as a digitizer or tablet and, more particularly, to an improvement in a method and apparatus for scanning many sensor coils provided side by side on a sensor unit of the position detector.

2. Description of Related Art

A variety of position detecting methods in position detectors have been known. For example, U.S. Pat. No. 5,466,896, the disclosure of which is hereby incorporated by reference, and Japanese published patent application No. 3-147012 disclose an electromagnetic transfer system. FIG. 7 is a schematic block diagram illustrating the basic operation of a position detector employing an electromagnetic transfer system.

A position indicator 110 shown in FIG. 7 has a resonance circuit 101 composed of a coil and a capacitor. A position detector 111 is constituted by a sensor unit 102, a coil selector 103, a send/receive selector 104, a high-frequency signal generator 105, a receiving circuit 106, and a signal processing unit 107. The position indicator 110 preferably has a pen shape or a puck shape. The pen shape suggests a writing tool that indicates a position when it is held in a hand of an operator. The puck shape suggests a cursor that continues to indicate a position even when the operator releases it, i.e. it can be left alone. The operator holds the position indicator 110 to specify a position (pointing entry), enter hand-written characters, drawing, or to perform other coordinate input operation on a computer. The position indicator 110 includes at least a coil or the resonance circuit 101.

The sensor unit 102 has a plate-like sensor surface, a point on which is defined by an X-Y rectangular coordinate. The sensor unit 102 is formed by arranging many sensor coils 100 side by side in an X-axis direction 108 and a Y-axis direction 109. In FIG. 7, only the sensor coils arranged in the X-axis direction are shown in order to avoid confusion. There are actually a few tens of the sensor coils; however, only three sensor coils are illustrated in the drawing for clarity.

In the position detector 111 which employs the electromagnetic transfer system, electromagnetic waves are transferred between the sensor coils 100 on the sensor unit 102 and the position indicator 110 in order to determine the coordinate value of a position specified by the position indicator according to a signal received by the sensor coils 100. Further, the position detector 111 is preferably provided with means for entering information from the switch of the position indicator or information on writing pressure in addition to the information on the coordinate value of the position indicator.

Two sets of sensor units are normally provided. The two sets of coils are preferably orthogonalized in the X-axis direction and the Y-axis direction, respectively, in order to perform coordinate detection in two directions, namely, the X-axis direction and the Y-axis direction. In this case, it should be noted that "the sensor coils in the X-axis direction" means that they are arranged in the X-axis direction rather than meaning that they are extended in the X-axis direction. As illustrated in FIG. 7, the lengthwise direction of the sensor coils in the X-axis direction agrees with the Y-axis direction.

The high-frequency signal generator 105 is a circuit for generating an AC signal of a predetermined frequency (e.g. a predetermined value in a range from a few hundreds of kilohertz to a few megahertz). The receiving circuit 106 is a circuit composed primarily of an amplifier. The signal processing unit 107 is composed primarily of a processor (CPU) and a storage circuit; it carries out XY-coordinate calculation according to the output of the receiving circuit 106. The processor of the signal processing unit 107 functions to control the coil switching of the coil selector 103 and the switching of the send/receive selector 104. For the purpose of clarity, the signal lines for controlling the coil selector 103 and the signal lines for controlling the send/receive selector 104 are omitted in FIG. 7. The coil selector 103 may be constituted by a well-known multiplexer. Likewise, the send/receive selector 104 may be constituted by a well-known switching circuit.

The position detecting process in the electromagnetic transfer system will now be described. It is assumed that the foregoing processor of the signal processing unit 107 has set the send/receive selector 104 for the send mode, namely, for the high-frequency signal generator 105, and the processor has set the coil selector 103 to select one particular sensor coil 100 in a sensor coil group of the sensor unit 102.

The high-frequency signal generator 105 generates a high-frequency signal and applies that signal to the selected sensor coil 100 via the send/receive selector 104 and the coil selector 103. The sensor coil 100 then produces an electromagnetic wave that will be referred to as "transmitter signal." When the position indicator 110 is placed near the sensor surface under this condition, the resonance circuit 101 in the position indicator 110 resonates due to the transmitter signal. Then, the processor of the signal processing unit 107 sets the send/receive selector 104 to the receive mode, namely, for the receiving circuit 106, to stop the issuance of the transmitter signal from the sensor coil 100. In other words, the supply of the high-frequency signal from the high-frequency signal generator 105 is stopped.

Under this condition, the oscillatory phenomenon in the resonance circuit 101 incorporated in the position indicator 110 does not stop immediately; damping oscillation continues for a while. Hence, the coil of the resonance circuit 101 generates an electromagnetic wave that will be referred to as a "response electromagnetic wave." The sensor coil 100 receives this response electromagnetic wave, and the signal received by the sensor coil 100 at this time will be referred to as a "received signal". The received signal is sent to the receiving circuit 106, where it is processed, via the coil selector 103 and the send/receive selector 104. The signal which has been processed by the receiving circuit 106 is further handed to the signal processing unit 107 which performs XY coordinate calculation and the analysis of switch information according to the amplitude, phase, and so on of the processed signal. The obtained coordinate value and switch information are sent out to a host apparatus not shown, i.e. an external computer.

The resonance circuit 101 in the position indicator 110 shown in FIG. 7 is represented as a coil or the resonance circuit 101 because the resonance phenomenon is not necessary as long as magnetic coupling takes place between the sensor coils.

The sending and receiving operation of the sensor coils 100 is repeated while switching in sequence among the multiple sensor coils 100 on the sensor unit 102 in a position detecting direction. The operation of switching among the multiple sensor coils 100 in sequence will be referred to as "scanning".

It has already been mentioned that, among the components making up the position detector 111, the coil selector 103 composed mainly of a multiplexer is primarily responsible for selecting and switching among the multiple sensor coils 100. Also, it has already been mentioned that the coil selector 103 is connected to the processor of the signal processing unit 107 by a signal line, which is not shown, and it is controlled by the processor. The program describing the operation of the processor is stored in a storage device called a ROM (read-only memory) of the signal processing unit 107. The storage device is preferably a component of the position detector. The processor reads the program stored in the ROM and executes the scanning according to the program. Accordingly, the position detecting process, particularly the scanning method for the sensor coils 100, can be modified by the program stored in the ROM.

The position detecting process will now be described.

The position detecting process includes the procedure from a point at which no coordinate information (not even an approximate position) on the position indicator 110 has been obtained to a point at which the detailed coordinate of the position indicator is calculated. As previously mentioned, this process corresponds to the processing contents of the processor of the signal processing unit 107 shown in FIG. 7. From this viewpoint, the position detecting process is not merely scanning (selecting in a predetermined sequence) the sensor coils 100. The position detecting process also includes processing in which the processor of the signal processing unit 107 acquires the output obtained by the receiving circuit 106 as the result of the selection, the processing for carrying out the coordinate calculation based on the signal level obtained from the previous processing, and the processing for sending out the coordinate value, which has been finally obtained, to external equipment, i.e. a computer which is host equipment in most cases.

The processing for obtaining the output signal of the receiving circuit 106 is implemented immediately after every scan of each of the sensor coils 100. The coordinate calculation processing is implemented immediately after the receiving levels (the voltage levels of the transmitter signals of the receiving circuit 106) at a plurality of (about 2 to about 4) sensor coils located in the vicinity of the position indicator 110 have been obtained. As a specific method for the coordinate calculation, 2-point technique or 3-point technique (quadric function approximation) is known. The coordinate value sending-out processing is implemented upon completion of the coordinate calculation. The obtained coordinate value is sent out to external equipment by using a well-known interface circuit such as a means which conforms to the RS-232C standard.

This description will now focus on the scanning procedure of the sensor coils 100, abstracting the procedure for obtaining the output of the receiving circuit 106, the coordinate calculation processing, and the processing for sending out the coordinate value.

FIG. 8 shows a flowchart of the position detecting process in a conventional electromagnetic transfer system. As illustrated in FIG. 8, the process for detecting a position of the position indicator may be roughly divided into an all-scan process and a sector-scan process. The term "all-scan" indicates scanning the sensor coils over the entire area of the sensor coil surface, i.e. the surface on which the X- and Y-axis sensor coil is provided side by side. All-scan does not always refer to a case where all sensor coils are scanned; it may refer to a case where, for example, every other sensor coil is scanned. In the flowchart, only "scan" is shown for the purpose of simplicity; the actual scanning operation, however, includes a plurality of steps. For this reason, the boxes with double-line sides are used for steps ST200 and ST400 of FIG. 8. In the actual operation, every time each sensor coil 100 is scanned, the control step for switching the send/receive selector 104 and the processing step for acquiring the transmitter signal of the receiving circuit 106 are carried out.

The processing for detecting a position indicator starts with the all-scan process (step ST200). The all-scan process is implemented for both the X-axis and the Y-axis. This all-scan may be regarded as rough detection because it is intended mainly for quickly obtaining the approximate position of the position indicator 110.

At the completion of the all-scan process, the processor will have obtained the signal intensity distribution of the received signals on the sensor unit according to the signals received from the sensor coils 100. This is illustrated in FIG. 9. The nearly square member in FIG. 9 represents the sensor unit 102. The thick arrows crossing on the sensor unit 102 indicate the coil selecting directions of the X-axis and Y-axis. As shown in FIG. 9, it is assumed that the position indicator 110 is pointing at a certain position on the sensor unit 102. The signal intensity distribution obtained by the processor upon completion of the all-scan process is shown by the bar graph shown in FIG. 9. The bar graph shows only the intensity distribution obtained by the scan in the X-axis direction. As indicated by the bar graph, when the position indicator 110 is located near the sensor surface, the intensity of the received signal of the sensor coil closest to the position indicator 110 shows the highest value. Hence, the group of several sensor coils around the sensor coil giving the highest value shows the peak of the signal intensity distribution. This makes it possible to know the approximate position.

FIG. 9 shows a constant level of signal intensity in the area other than the group of several sensor coils around the sensor coil giving the highest value. Such a constant level of signal intensity is sometimes called an offset value because there is a certain level of output even when no input is applied to the receiving circuit 106 in FIG. 7.

The program determines in step ST299 whether the signal intensity of the received signal shown in FIG. 9 is larger than a predetermined value. If the signal is smaller than the predetermined value, the program goes back to the all-scan step ST200. If the signal is larger than the predetermined value, the program moves onto the sector-scan step ST400. The predetermined value is a "threshold value" that is a preset appropriate value above the offset value mentioned above.

In the sector-scan step ST400, the foregoing sending and receiving operation is repeated using the sensor coil at the central position and several sensor coils adjacent thereto obtained as the result of the all-scan step. As shown by the coil selecting area in FIG. 10, the sector-scan step ST400 is carried out at least on the X-axis and the Y-axis. This allows the detailed signal intensity distribution to be obtained as shown in FIG. 10; the coordinate value is determined by performing the interpolative calculation of the respective received signals in the signal processing unit 107 shown in FIG. 7. Thus, the sector-scan is a more detailed detection process.

The term "more detailed" means more detailed both time-wise and space-wise. More specifically, "more detailed in time" comes from the fact that the time required for the sector-scan is shorter than that required for the all-scan. For instance, if all-scan takes five times as long as the sector-scan takes, then it means that five coordinate values can be obtained by the sector-scan in the same time as that for the all-scan to obtain one coordinate value. This characteristic contributes to good trackability primarily in the dynamic characteristic of the position detector, especially when the position indicator moves quickly.

The situation of "more detailed space-wise" may occur when the all-scan step skips some coils (the all-scan can include the skipping scan as previously mentioned). No skipping occurs during the sector-scan step. This is a problem with the spatial gaps of the sensor coils used; therefore, the spatial detailedness contributes to the resolution or accuracy of the obtained coordinate value.

As shown in FIG. 8, when the position detector 111 initially starts up, the program performs the all-scan in step ST200. If an approximate position of the position indicator 110 is found, the program gives an affirmative determination result (YES) in step ST299 and proceeds to the sector-scan in ST400. If no approximate position is found, the program gives a negative determination result (NO) in step ST299 and repeats the all-scan in step ST200 thereafter. The affirmative determination result (YES) is given in step ST499 as long as the coordinate of the position indicator 110 is obtained by the sector-scan; hence, the sector-scan is repeated. If the position indicator 110 is missed during the sector-scan, then the program gives the negative determination result (NO) in step ST499, so that it goes back to the all-scan in ST200. Thus, the two different scanning methods, namely, the all-scan and the sector-scan, are combined to accomplish efficient coordinate detection.

An example of the method for detecting a plurality of position indicators will now be described.

The method for detecting a single position indicator is called "single-scan"; the method for detecting a plurality of position indicators is called "multi-scan".

The same number of resonance circuits of different resonance frequencies as the number of position indicators to be detected are prepared, and all the position indicators are provided with the prepared resonance circuits. A position detector sends and receiving at particular frequencies for the position indicators and carries out all-scan or sector-scan for the respective resonance frequencies alternately so as to detect the multiple position indicators.

To multi-scan for two indicators, two position indicators having different, fixed resonance frequencies are prepared to enable a position detector to communicate with the position indicators by using the different frequencies. In this case, one of the following different scanning processes is selectively implemented: in a first process, all-scan is carried out for two different frequencies alternately; in a second process, two types of scanning are alternately carried out, namely, sector-scan for one frequency and all-scan for the other frequency; and in a third process, the sector-scan is carried out for the two frequencies alternately.

The description given above is based on the assumption that the electromagnetic transfer system is employed. There are, however, other position detecting systems. As a simple electromagnetic system, there is one in which electromagnetic waves are transmitted from a sensor surface and received by a position indicator, or electromagnetic waves are transmitted from the position indicator and received by the sensor surface. There is a cross type detection system in which a sensor coil in the X-axis direction transmits a signal and a sensor coil in the Y-axis direction receives it. There is also a self-oscillation type detection system disclosed in Japanese Unexamined Patent Publication No. 5-241722.

Thus, all the systems described above have, in common, a plurality of coils arranged side by side in the X and Y directions to scan the coils so as to perform coordinate detection. For this reason, all the systems are facing the task of achieving efficient scanning to detect a plurality of position indicators.

There has been, however, a problem with the multi-scan for detecting the positions of a plurality of position indicators at the same time. Detecting the positions of the position indicators requires that the sensor coils of the position detector be scanned alternately for the same number of times as the number of position indicators. In comparison with the single-scan for detecting the position of only one position indicator, the multi-scan avoidably exhibits deteriorated performance in the trackability of coordinate values in relation to the actual positions of the position indicators when the position indicators are moved, or a deteriorated dynamic characteristic which is the performance involved in relatively quick moving of position indicators.

Normally, the trackability of the multi-scan for detecting two position indicators is reduced simply to half of that of the single-scan for detecting only one position indicator, thus leading to deterioration in performance of the multi-scan.

More specifically, in the case of the multi-scan for detecting at least two position indicators, the sensor coils of the position detector are scanned alternately to detect the position indicators. This has resulted in slower recognition of the position indicators.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

Accordingly, it is one object of the present invention to improve trackability in detecting a plurality of position indicators.

It is another object of the present invention to provide further practical trackability according to the position indicator used, by making it possible to set or change scan repeating frequency and so on according to the type of the position indicator.

To attain the advantages and in accordance with the purpose of the invention, as embodied and broadly described herein, the invention comprises a first detection process for detecting an approximate position of a first position indicator by an all-scan step for detecting the approximate position of the position indicator on a coordinate reading surface by extensively scanning many sensor coils along coordinate axes; and a second detection process in which, if it has been determined that the first position indicator is present on the coordinate reading surface in the first detection process, then a sector-scan step for performing more detailed detection of the position of the first position indicator by specifying the sensor coils to be scanned in accordance with the positional information of the first position indicator which has been detected by the first detection process, and an all-scan step for detecting the approximate position of a second position indicator are implemented alternately; wherein the sector-scan step is implemented at a higher repeating frequency than the all-scan step in the second detection process.

If it has been detected that the first position indicator is present on the coordinate reading surface by the all-scan in the first detection process, then a program moves to a second detection process. In the second detection process, the sensor coils are specified and scanned according to the positional information on the first position indicator so as to alternately carry out the sector-scan step for performing more detailed detection of the position of the first position indicator and the all-scan step for detecting the approximate position of the second position indicator. To alternately carry out the two types of scans, the sector-scan is implemented more frequently than the all-scan.

Thus, the second position indicator can be detected with a minimum sacrifice in the trackability of the first position indicator.

Further, according to the invention, the repeating frequency, etc. of the all-scan step or the sector-scan step can be set or changed according to the type or the like of the position indicator.

Hence, further practical trackability can be achieved for the type of position indicator used.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

An embodiment of the present invention will now be described in conjunction with the accompanying drawings.

Figure 1:
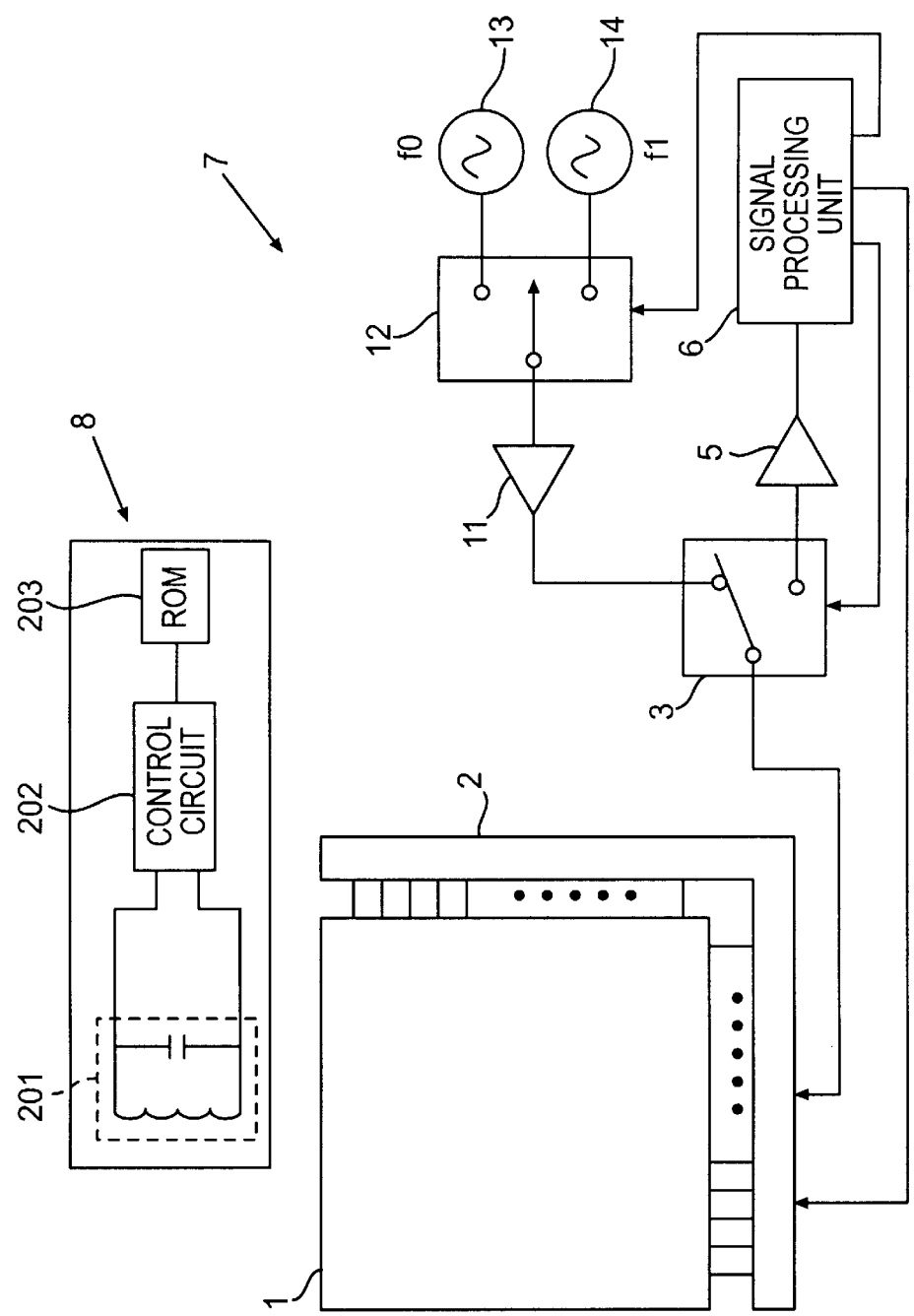
FIG. 1 is a block diagram showing an embodiment of the invention.

FIG. 1 is the block diagram of a position detector of a first embodiment in accordance with the present invention. Although it is not shown in FIG. 1, a sensor unit 1 includes forty loop coils disposed in parallel to the X-axis and forty loop coils disposed in parallel to the Y-axis, thus forming a coordinate reading surface. The respective loop coils constitute sensor coils connected to a selector circuit 2 for selecting the loop coils. The selector circuit 2 is connected to a send/receive selector circuit 3. An amplifier 5 is connected to the receiving end of the send/receive selector circuit 3, and the output end of the amplifier 5 is connected to a signal processing unit 6. The signal processing unit 6 includes a central processing unit (CPU), a read-only memory (ROM), etc. The output end of a current driver 11 is connected to the sending end of the send/receive selector circuit 3; a frequency selector switch 12 is connected to the input end of the current driver 11; and oscillators 13 and 14 which have different frequencies are connected to the frequency selector switch 12.

The frequency selector switch 12 switches in response to a control signal received from the CPU in the signal processing unit 6. The switch 12 sets the frequency of a signal transmitted from each loop coil to f0 or f1. The frequency f0 equals the resonance frequency of a first position indicator, while the frequency f1 equals the resonance frequency of a second position indicator.

The CPU in the signal processing unit 6 supplies other control signals to the selector circuit 2 and the send/receive selector circuit 3 so as to scan the sensor coils or select between the send mode and the receive mode. The selector circuit 2 and the signal processing unit 6 comprise a selecting means for selectively scanning the sensor coils; they select the sensor coils in sequence to selectively scan or select a particular area or a particular number of sensor coils to scan in the all-scan mode and the sector-scan mode.

A position indicator 8 includes: a resonance circuit 201 composed of a coil and a capacitor; a ROM 203 storing the shape or usage of the position indicator, the description of information that can be provided, or the information on a particular identification (ID) of the position indicator; and a control circuit 202 that mainly carries out the control for reading the contents stored in the ROM 203 and supplying them to the resonance circuit 201. In the position indicator 8, only the section related to the invention is shown in a simplified manner. The position indicator 8 does not necessarily include a resonance circuit; it may alternatively include only a coil as long as it can magnetically couple with the sensor unit 1 to send and receive signals.

To simplify the description hereinafter, the description of switching the sensor coils in sequence, which is performed in actual operation, will be omitted. The switching of the sensor coils will be referred to simply as the "scanning step". In the following description, both X-axis and Y-axis will be scanned at the same time in one process; however, either the X-axis or the Y-axis may be separately scanned.

The embodiment will be described in conjunction with the state diagrams of FIGS. 4(a)–4(d) which show the relationship between the position detector and the position indicator in a time series.

Figure 4A:
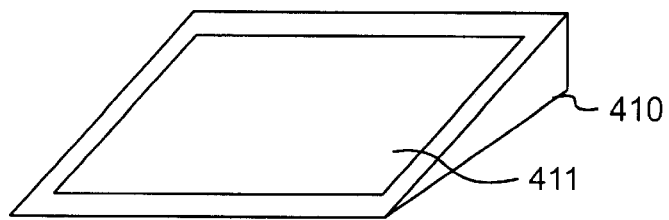
FIGS. 4(a) to 4(d) are a schematic block diagrams of the embodiment.
Figure 4B:
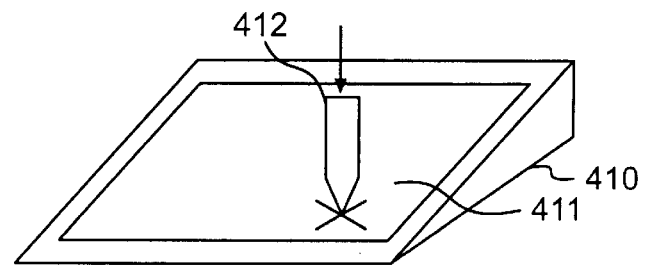
Figure 4C:
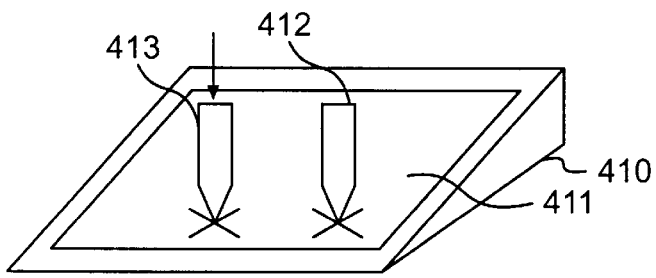
Figure 4D:
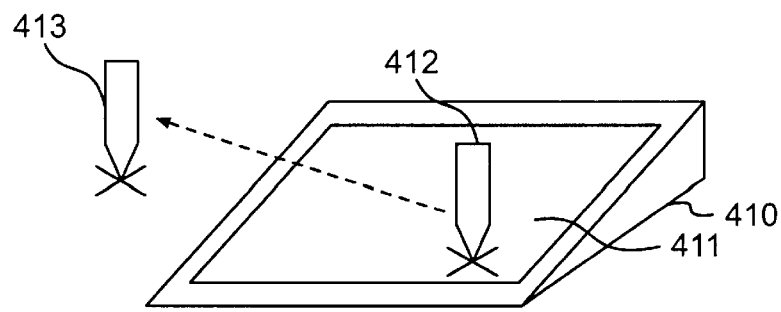

In FIGS. 4(a)–4(b), a position detector 410 is provided with an input surface 411. The input surface 411 is a sensor coil in the circuit and hence it is also referred to as the sensor surface 411. The position indicator shown in FIGS. 4(b)–4(d) is a pen type indicator "stylus pen"; however, since the present invention applies to any type of position indicator, it is called simply as "position indicator". In FIG. 4(a), the all-scan step is implemented, and no position indicator is placed on the sensor surface 411.

When a first position indicator 412 having a resonance circuit of the resonance frequency f0 is placed on the sensor surface 411, a state shown in FIG. 4(b) is set for carrying out the sector-scan step on the first position indicator 412. Then, when a second position indicator 413 having a resonance circuit of the resonance frequency f1 is placed on the sensor surface 411, a state shown in FIG. 4(c) is set for carrying out the sector-scan step on the first and second position indicators 412 and 413, respectively. Further, when the second position indicator 413 moves away from the sensor surface 411 so that the position detector 410 can no longer detect the second position indicator 413, a state shown in FIG. 4(d) is set, wherein the sector-scan step is implemented for detecting the first position indicator 412 and the all-scan step is implemented for detecting the second position indicator 413. In the state shown in FIG. 4(d), the second position indicator 413 is rendered undetectable as an example; however, the first position indicator 412 may alternatively be rendered undetectable.

Figure 2:
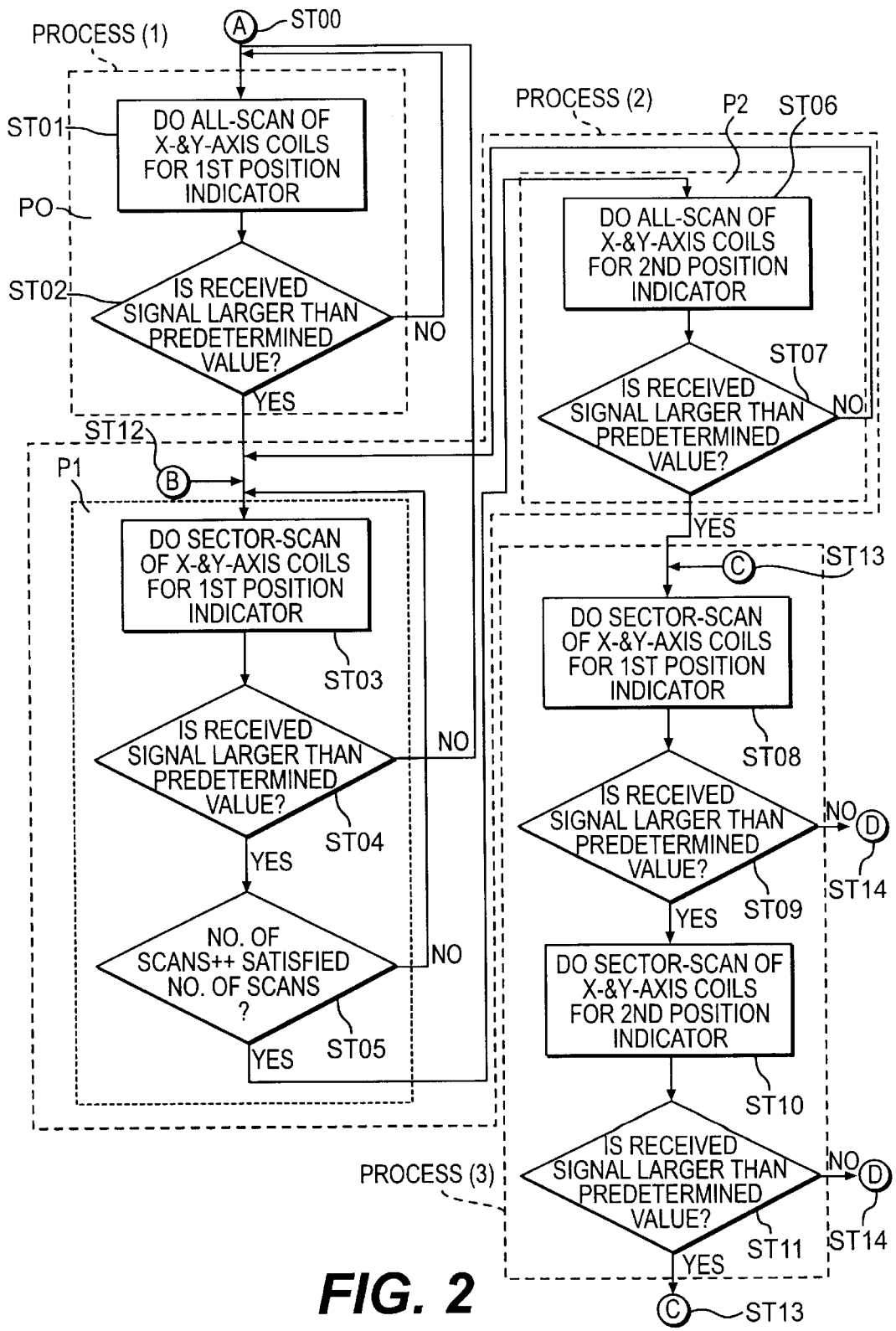
FIG. 2 is a flowchart for illustrating the operation of the embodiment.
Figure 3:
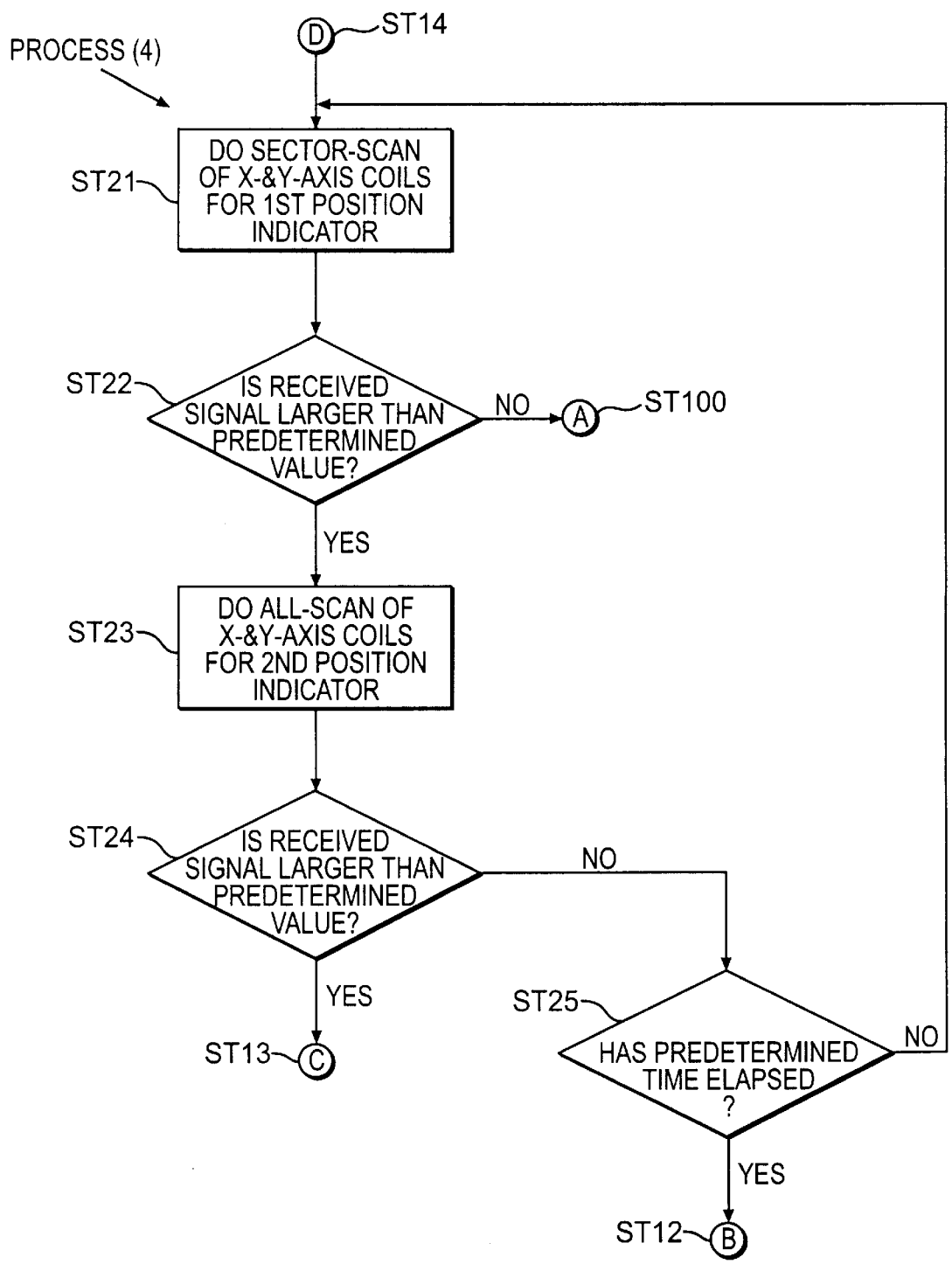
FIG. 3 is another flowchart for illustrating the operation of the embodiment.
Figure 5:
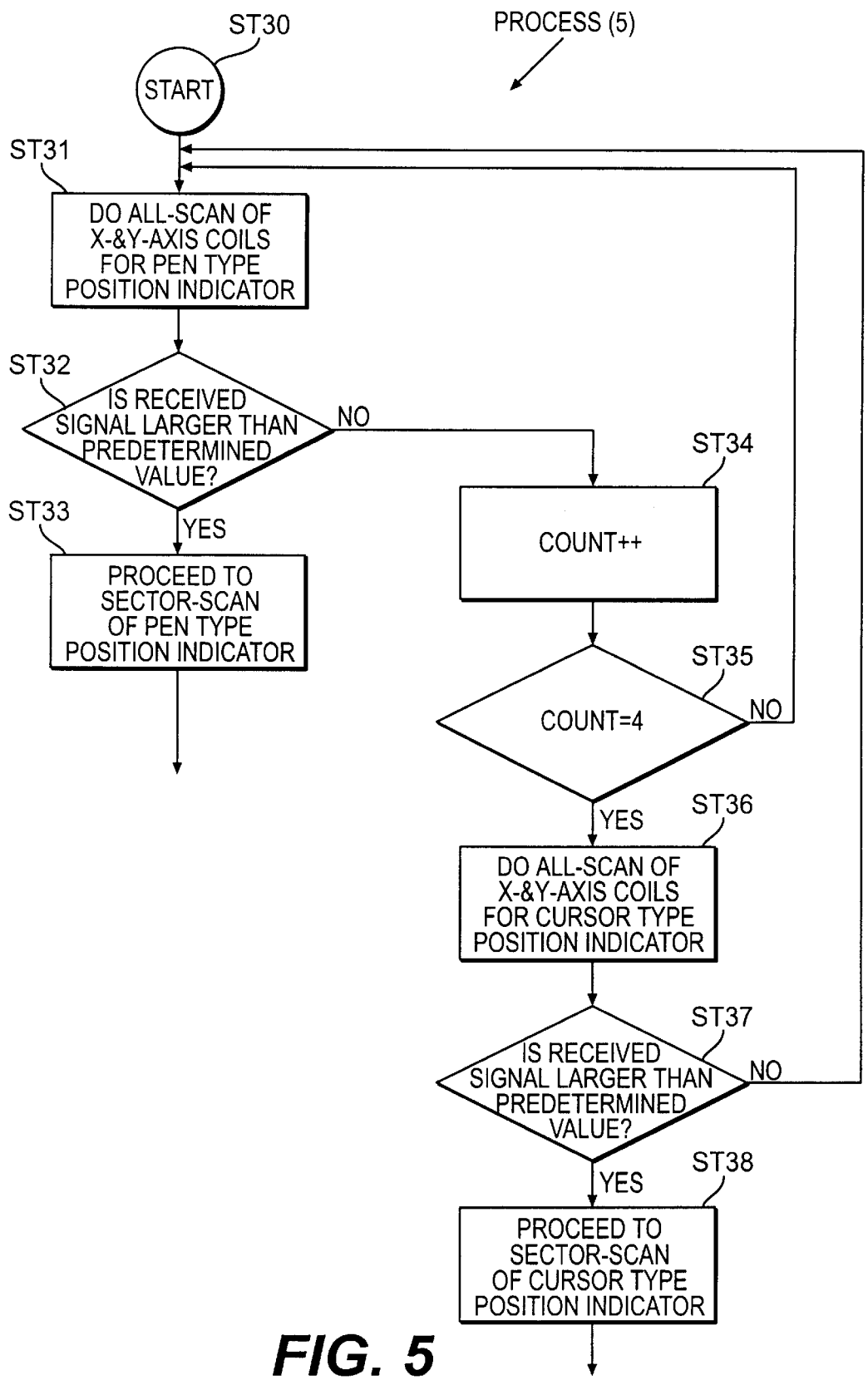
FIG. 5 is a flowchart for illustrating the operation of another embodiment.

FIGS. 2, 3, and 5 show flowcharts illustrative of the operation of the signal processing unit 6 of FIG. 1. The first embodiment will be described referring to FIG. 1 to FIG. 5.

In the states shown in FIG. 4(a) and FIG. 4(b), the position detector 410 first carries out an all-scan step ST01 on the first position indicator 412 at the frequency f0 in process P0 and process (1) in FIG. 2. It is determined in step ST02 whether a received signal is larger than a predetermined value. If the received signal is larger than the predetermined value i.e. if detection is enabled, then the position detector 410 moves onto a sector-scan step ST03.

Process (2) combines process P1 and process P2 and will now be described. In step ST04, it is determined whether the received signal which has been subjected to the sector-scan step ST03 is larger than the predetermined value. If the received signal is smaller than the predetermined value, the program returns to step ST01. If the received signal is larger than the predetermined value, the number of scans is first incremented and moves to ST05 wherein it is determined whether a predetermined number of scans has been satisfied. If the predetermined number of scans has not been satisfied, then steps ST03 and ST04 are repeated. If the predetermined number of scans is satisfied, then all-scan step ST06 for detecting the second position indicator 413 is carried out at the frequency f1. Then, it is determined in step ST07 whether the received signal is larger than the predetermined value. If the received signal is less than the predetermined value, the program returns to step ST03. If the received signal is larger than the predetermined value, the program proceeds to step ST08.

In process (2), the all-scan for detecting the second position indicator 413 is continued although the all-scan step for detecting the second position indicator 413 is implemented at a lower repeating frequency than that of the sector-scan step for detecting the first position indicator 412. More specifically, the repeating frequency of the all-scan step for detecting the second position indicator 413 is lower than the repeating frequency of the sector-scan step for detecting the first position indicator 412, and these are alternately repeated.

An example of the scanning repeating frequency mentioned above will be described. The ratio of the number of repetitions of the first position indicator 412 to the second position indicator 413 is set to 4:1. In this case, the predetermined number of repetitions in step ST05 is set to 4. Thus, detection process P1 wherein the first position indicator 412 is detected four times in succession is carried out. Then, detection process P2 wherein the second position indicator 413 is detected once is carried out. The respective detection processes P1 and P2 are implemented alternately. This enables the detecting operation to be performed with minimized sacrifice in the trackability of the first position indicator 412.

Irregular scanning may affect the coordinate moving intervals. However, this problem may be alleviated by carrying out coordinate travel averaging processing or a method for predicting coordinate travel.

The scan repeating frequency can be changed as desired by a user according to the size of the effective area of the position detector or the application in which the position detector is used. For instance, a means for communicating with a host computer connected to the signal processing unit 6 of the position detector shown in FIG. 1 enables the signal processing unit 6 to receive an instruction signal. The communication means transmits the instruction signal from the host computer, through a receiving means, so as to change the setting of the repeating frequency according to the type of instruction signal.

A control unit such as a push-button switch or a rotary switch may be connected to the signal processing unit 6. The signal processing unit detects the operating amount of the control unit, such as the number of pushes on the switch, the rotary angle, or the like, thereby making it possible to set or change the repeating frequency. Such a set value which has been established or updated may be stored in an involatile storage device or the like such as an EEPROM or a flash memory which permits electrical writing and erasing. Reading in the new set value each time the power of the position detector is turned ON eliminates the need for instructing every new set value.

Process (1) corresponds to the first detection process, while process (2) corresponds to the second detection process in the position detecting method.

Process (1) constitutes the first detecting means, while process (2) constitutes the second detecting means in a position detector 7.

In the state (c) of FIG. 4, the program proceeds from process (2) to process (3).

In process (3), sector-scan step ST08 is implemented for detecting the first position indicator 412; and in step ST09, it is determined whether the received signal is larger than a predetermined value. If the received signal is larger than the predetermined value, then sector-scan step ST10 for detecting the second position indicator 413 is carried out. In step ST11, it is determined whether the received signal is larger than the predetermined value. If the receive signal is larger than the predetermined value, the program goes back to step ST08.

Process (3) shows the state wherein the sector-scan step is being implemented alternately on the first position indicator 412 and the second position indicator 413 which have been detected. In process (3), the scan repeating frequencies for the first and second position indicators 412 and 413, respectively, are set equally to 1:1. More specifically, the first position indicator 412 is sector-scanned for a predetermined number of times. Then, the second position indicator 413 is sector-scanned for a predetermined number of times. When repeating the sector-scanning of the two position indicators alternately, the same number of times is set for carrying out the sector-scan of the position indicators 412 and 413. This is effective for providing equal trackability while the two position indicators are being detected. Process (3) corresponds to a third detection process in the position detecting method.

The state shown in FIG. 4(d) will now be described.

If it is determined that the received signal of sector-scan step ST10 for detecting the second position indicator 413 is smaller than the predetermined value in step ST11, then the program moves onto step ST14 (ST21) of FIG. 3 where process (4) is implemented.

In process (4), sector-scan step ST21 for detecting the first position indicator 412 is carried out. Then, it is determined in step ST22 whether the received signal is larger than the predetermined value. If the received signal is larger than the predetermined value, all-scan step ST23 for detecting the second position indicator 413 is implemented, and it is determined in step ST24 whether the received signal is larger than the predetermined value. If it is determined in step ST24 that the received signal is smaller than the predetermined value, then the program proceeds to step ST25 wherein it decides whether a predetermined time has elapsed. If the predetermined time has not elapsed, the program returns to step ST21. If the predetermined time has elapsed, the program proceeds to step ST12.

In process (4), if it is determined that either the position indicator 412 or 413 is invalid while the sector-scan is being carried out on the first position indicator 412 and the second position indicator 413 which have been detected, and the program returns to the all-scan step, then the scan repeating frequency for the first position indicator 412 and the second position indicator 413 is maintained at 1:1 for the foregoing predetermined time. After the predetermined time has passed, the position indicator subject to the all-scan step is scanned at a lower repeating frequency than that for the position indicator subject to the sector-scan step. The two types of scans are alternately repeated as described above. Process (4) corresponds to a fourth detection process in the position detecting method.

There are two possible cases where the position indicators are rendered invalid. In one case, the position indicator is no longer necessary and the operator places the position indicator in an area out of the sensor surface, i.e. out of the effective zone of the position detector. In the other case, the position indicator is temporarily in an invalid state in an undetectable area while it is still held in a hand of the operator. The latter case often happens in normal operation. Hence, it is appropriate to maintain the scan repeating frequency at 1:1 within a certain time because it would take more time to recognize the position indicator if the program goes back to process (2) immediately after the all-scan step is started on the position indicator.

There are two methods to set the above certain time or predetermined time: in one method, the time may be set, for example, to one minute; and in the other method, one process of the all-scan or sector-scan may be regarded as one count, and the certain time may be set as 10,000 counts.

There is also a different method whereby the repeating frequency is gradually changed within a certain time. For instance, when the ratio of the detection repeating frequency of the first position indicator 412 and the detection repeating frequency of the second position indicator 413 are set to 4:1, the repeating frequency is 1:1 in the state of sector-scan step process (3) (state shown FIG. 4(c)) in which both the first position indicator 412 and the second position indicator 413 are being detected. When the second position indicator 413 is placed in an invalid state (state shown in FIG. 4(d)), the program returns to the all-scan step for detecting the second position indicator 413. At this time, the repeating frequency within one minute will be as follows: the ratio of the process for the first position indicator 412 to the process for the second position indicator 413 equals 1:1. When one minute has elapsed, a repeating frequency of 2:1 is applied. When another one minute has elapsed, a repeating frequency of 3:1 is applied. When yet another one minute has elapsed, the repeating frequency of 4:1 is applied. Thus, the scan repeating frequency is gradually changed as time passes.

The foregoing set predetermined time may be changed as desired according to the size of the effective area of the position detector or the application in which the position detector is used. As the setting method, the one described in conjunction with process (2) may be employed.

Another embodiment related to the all-scan step will now be described.

In a position detector adapted to detect a plurality of position indicators by their different resonance frequencies, the position indicators have resonance frequencies which are set according to the shapes thereof. For example, a pen type position indicator has a first resonance frequency, while a cursor type position indicator has a second resonance frequency. In this case, in the state (a) of FIG. 4, the pen type position indicator and the cursor position indicator are not located on the sensor surface, and the all-scan step is implemented on the two types of position indicators alternately.

In this case, process (5) shown in FIG. 5 is carried out. First, the all-scan step for detecting the pen type position indicator of the first resonance frequency is carried out in step ST31. It is determined in step ST32 whether the received signal is larger than a predetermined value. If the received signal is smaller than the predetermined value, the counter is incremented in step ST34. In the following step ST35, it is determined whether the value on the counter is identical to the predetermined value (the predetermined value in this embodiment is "4"). If the counter value is less than the predetermined value, the program goes to step ST31. If the counter value is identical to the predetermined value, the predetermined value is initialized before moving to the all-scan step ST36 for detecting the cursor type position indicator. In step ST37, it is determined whether the received signal is larger than the predetermined value. If the received signal is smaller than the predetermined value, the program goes back to step ST31. Although it is not shown, if the pen type position indicator or the cursor type position indicator becomes undetectable and invalid after the program proceeds to the sector-scan in step ST33 or ST38, then the program moves onto a step for carrying out the all-scan step.

In process (5), the all-scan step for detecting the position indicator for which the recognizing time needs to be shortened is repeatedly implemented more frequently than that for detecting the other position indicator. The all-scan step is repeated on these two position indicators alternately.

It is known that the pen type position indicator, for example, moves up and down frequently on the sensor surface, causing the valid and invalid processing to be switched frequently. Hence, the position indicator must be recognized quickly. In contrast to this, the cursor type position indicator is normally placed in the effective area of the position detector, so that the recognizing speed is not as important as in the case of the pen type indicator. In this embodiment, when the resonance frequencies are set for the pen type position indicator and the cursor type position indicator, respectively, and the position detector scans for those resonance frequencies alternately, the all-scan step for the pen type position indicator is implemented at a higher repeating frequency than that for the cursor type position indicator so as to achieve time-efficient recognition of the position indicators by their shapes. Process (5) corresponds to a fifth detection process in the position detecting method. Also, process (5) constitutes a third detecting means in the position detector 7.

Figure 6:
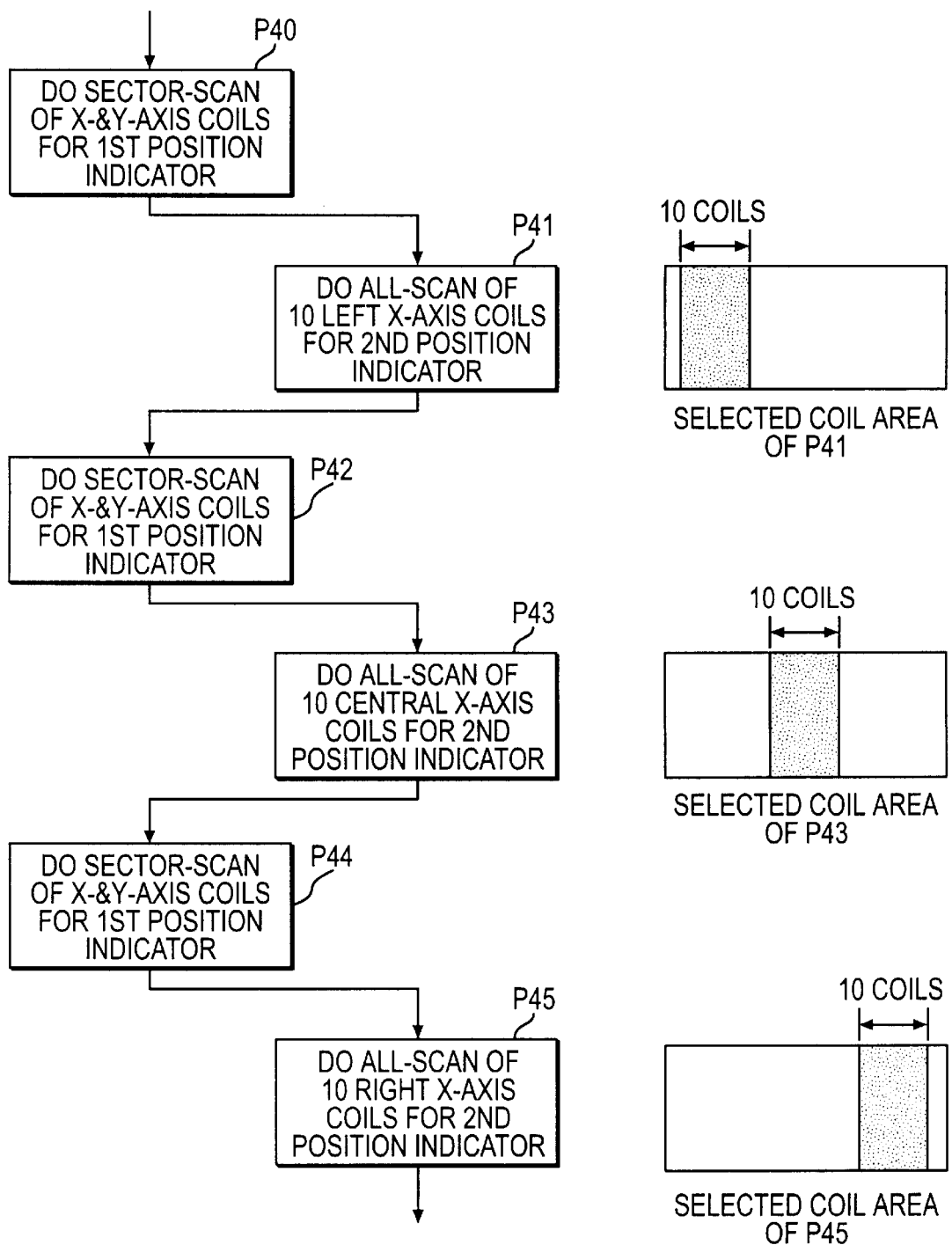
FIG. 6 is a flowchart for illustrating the operation of still another embodiment.
Figure 7:
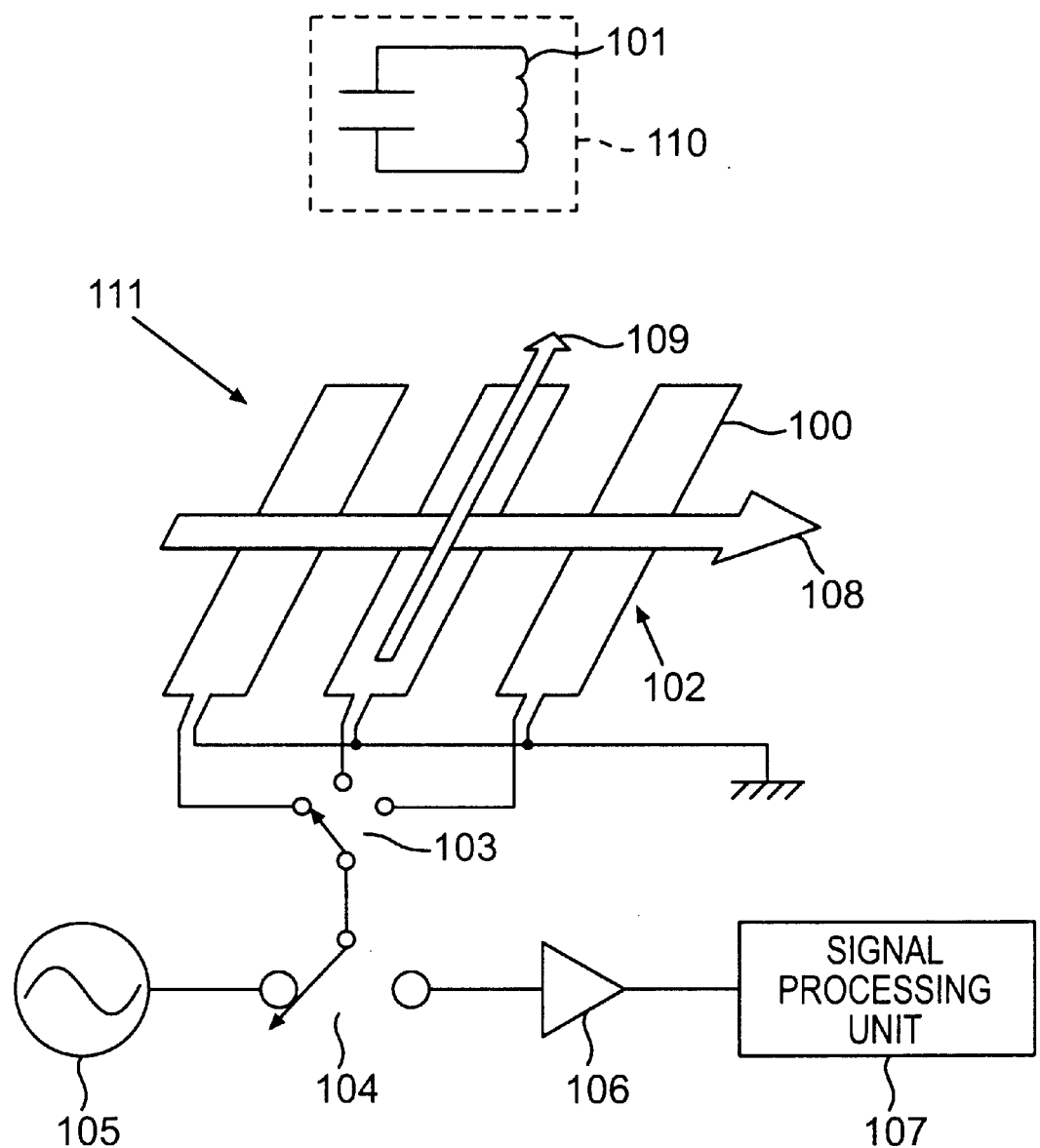
FIG. 7 is a block diagram for illustrating the basic operation of a position detector which employs a conventional electromagnetic transfer system.
Figure 8:
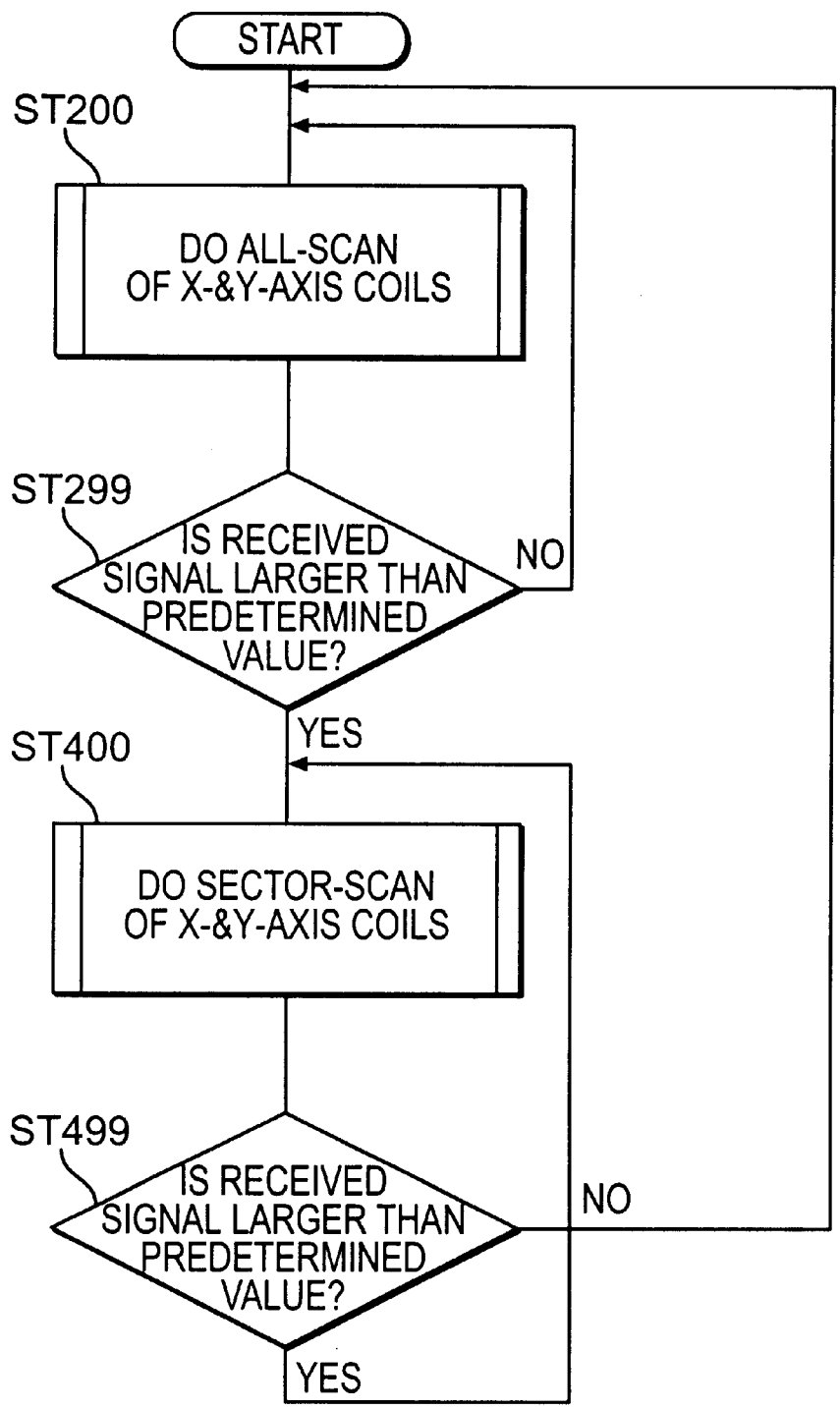
FIG. 8 is a flowchart showing the position detecting process in the conventional electromagnetic transfer system.
Figure 9:
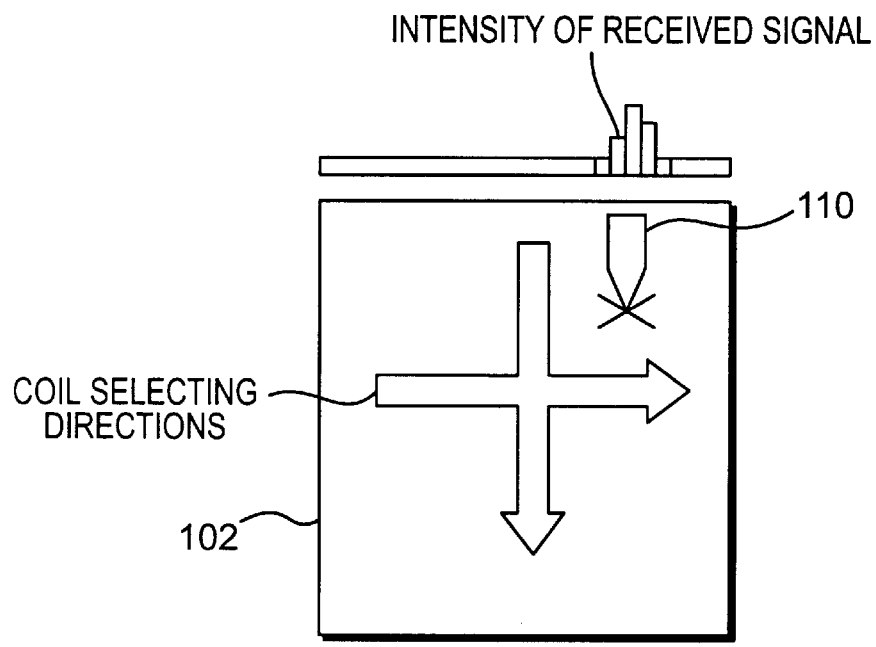
FIG. 9 is a schematic block diagram for illustrating the basic operation of the position detector which employs the conventional electromagnetic transfer system.
Figure 10:
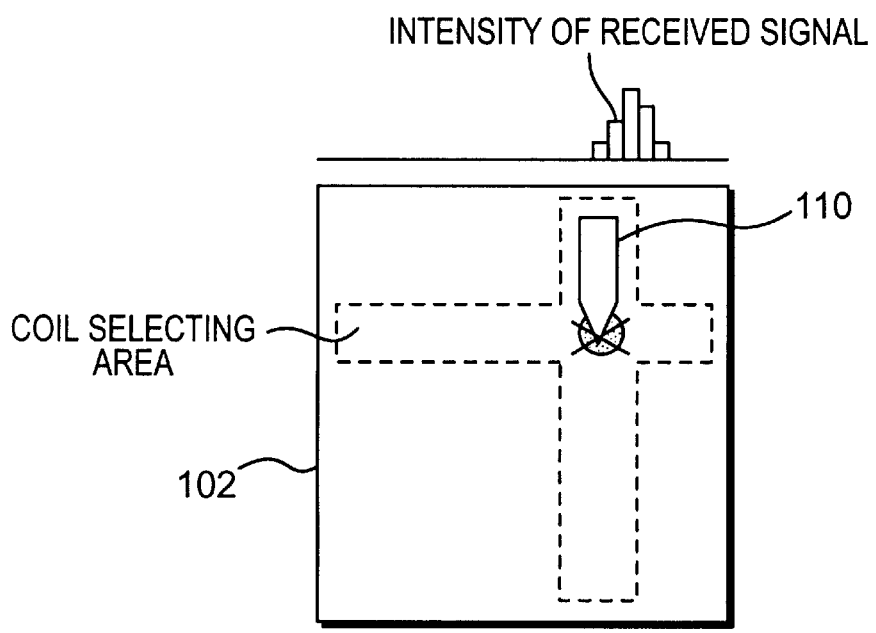
FIG. 10 is a schematic block diagram for illustrating the basic operation of the position detector which employs the conventional electromagnetic transfer system.

Another embodiment related to the all-scan step will be described with reference to FIG. 6. FIG. 6 corresponds to the state shown in FIG. 4(*b*); it is characterized in that the scan is limited to small areas rather than setting the scan repeating frequencies. In FIG. 6, only the characteristic portion of the all-scan step in this embodiment is shown.

In the state shown in FIG. 4(*b*), the first position indicator 412 is placed on the sensor surface 411, and the sector-scan step for detecting the first position indicator 412 and the all-scan step for detecting the second position indicator 413 are carried out alternately. At this time, the ratio of the repeating frequency of the sector-scan step to that of the all-scan step is set to 1:1.

First, sector-scan process P40 for detecting the first position indicator 412 is carried out. Process P40 corresponds to step ST03 and step ST04 of FIG. 2. Next, all-scan process P41 for detecting the second position indicator 413 is carried out. Process P41 corresponds to step ST06 and step ST07 of FIG. 2. As shown in FIG. 6, in this state, the two processes are implemented basically alternately. However, in process P41, if there are, for example, thirty X-axis sensor coils of the position detector 410, then ten sensor coils in the left area are subjected to the all-scan, for example, in the X-axis direction in this process. Likewise, the ten sensor coils in the central area are subjected to the all-scan in process P43, and the ten sensor coils in the right area are subjected to the all-scan in process P45. In this embodiment, the entire sensor surface is all-scanned in three processes.

Thus, in this embodiment, the number of coils to be scanned per process is reduced and the entire sensor surface is divided into a few areas to scan it in a few processes when carrying out the all-scan step.

The embodiment described above may be summarized as shown below:

(1) The first indicator is subjected to the sector-scan, while the second indicator is subjected to the all-scan of ten sensor coils in the left area.

(2) The first indicator is subjected to the sector-scan, while the second indicator is subjected to the all-scan of ten sensor coils in the central area.

(3) The first indicator is subjected to the sector-scan, while the second indicator is subjected to the all-scan of ten sensor coils in the right area.

This method completes the scanning process in one third of the time required when performing the all-scan over the entire sensor surface, providing an advantage in that the deterioration in the trackability of the sector-scan can be controlled.

The process shown in FIG. 6 constitutes a fourth detecting means in the position detector 7.

The set number of coils to be scanned may be changed as desired according to the size of the effective area of the position detector or the application in which the position detector is used. As the setting method, the one described above may be employed.

The small areas to be scanned and the numbers of the coils are set in advance and a plurality of scanning patterns of small areas or the number of sensor coils to be selected are prepared beforehand, the scanning patterns being stored in a data table. In the all-scan step, the pointer is incremented upon completion of one process, and the data table of the scanning patterns is referred to in sequence according to the pointer. Scanning based on the scanning area or selected sensor coils according to the referred contents enables a more sophisticated selecting method to be employed. For instance, a position indicator is usually placed at the center of the sensor surface at the beginning. Setting the scanning pattern such that the central area is scanned at a high frequency as a whole makes the operator feel that the position indicator is recognized more quickly in actual operation.

The following describes an example of the method for identifying the types of position indicators.

The position indicators are provided with means for sending information on the shape or usage of the position indicator, the information which can be provided, or the information on a particular identification (ID) to the position detector in the form of signals. As a simple means for this purpose, the differences of the position indicators are indicated by phase information in advance, so that the position detector may identify the position indicators by detecting the phases thereof.

Further, as shown in FIG. 1, the position indicator 8 may be provided with a control circuit 202 including an IC circuit and the ROM 203 for storing binary ID codes to provide a means for allowing digital information, i.e. ID information, to be transmitted to the position detector 7. The ID code at this time is binary ID data which provides the information on the shape or usage of the position indicator 8, the information that can be supplied, or the information on a particular ID. In brief, the control circuit 202 of the position indicator 8 is equipped with an IC circuit capable of receiving, through a resonance circuit, a signal sent from the sensor coils of the position detector 7 and of counting the receiving time of the signal. The position detector 7 is equipped with a means for changing the sending time of a transmitter signal and a setting means therefor. A relatively long transmitter signal is sent from the position detector 7 to the position indicator 8. The position indicator 8 receives the signal and reads a binary ID code from the ROM 203 of the position indicator 8 through the control circuit 202. At predetermined time intervals, the transmitter signal is sent to the position indicator 7 if the ID code is "1", whereas no transmitter signal is sent if the ID code is "0". The position detector 7 receives the signals and judges the information on the shape or usage of the position indicator 8, the information that can be supplied, or the information on a particular ID.

Using means described above makes it possible to detect the information on the shape or usage of the position indicator 8, the information that can be supplied, or the information on a particular ID.

The operator will be able to operate the position detector with optimum set values without worrying about setting details by using the detecting means in combination with the means for changing the setting of the scan repeating frequency, the number of coils or areas to be scanned, predetermined time, etc. which have been preset according to the information on the shape or usage of the position indicator 8, the information that can be supplied, or the information on a particular ID.

In the embodiments described above, only two position indicators have been detected; the invention, however, is applicable also to more than two position indicators.

The examples of the electromagnetic transfer type position detectors have been described; the present intention, however, can be applied to any type of position detector as long as it is a position detector which is adapted to detect a plurality of position indicators and which employs a method for selecting and scanning sensor coils.

Further in the above embodiments, the resonance frequencies for the position indicators have been fixed; however, they may be configured to permit switching among a plurality of different frequencies.

Thus, according to the present invention, when detecting a plurality of position indicators, the sector-scan step for detecting the first position indicator is implemented more frequently than the all-scan step for detecting the second position indicator; the sector-scan step and the all-scan step are alternately implemented repeatedly, thus permitting improved trackability.

Moreover, improved trackability of the position indicators can be achieved more effectively by employing the method wherein the same repeating frequency is applied to both types of scan when a plurality of position indicators have been detected. Then, the same repeating frequency is used for a predetermined time if one of the position indicators is found invalid and all-scan is initiated. The method for limiting the areas to be scanned also improves trackability.

In the all-can step, the scanning of the position indicator which must be recognized quickly is repeated more frequently than that of the other position indicator so as to enable quicker recognition.

Furthermore, the repeating frequency and the like are set according to the information on the shapes or usages of the position indicators, the information that the position indicators have, the information on particular IDs, or other information. This makes it possible to set the repeating frequency and so on suited for the position indicators, permitting higher efficiency in practical use.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for detecting the position of a first position indicator and a second position indicator on the surface of a sensor unit, the sensor unit comprising a plurality of conductive coils, a means for scanning the coils, and a means for detecting an interaction between the coils and the first position indicator and between the coils and the second position indicator, the method comprising the steps of:
   designating a first set of coils;
   scanning the first set of coils for the first position indicator and detecting an interaction between the first set of coils and the first position indicator;
   designating a second set of coils based upon the detected interaction between the first set of coils and the first position indicator;
   scanning the second set of coils for the first position indicator and detecting an interaction between the second set of coils and the first position indicator;
   designating a third set of coils; and
   scanning the third set of coils for the second position indicator.

2. The method as claimed in claim 1, wherein the first set of coils and the third set of coils comprise the same coils.

3. The method as claimed in claim 1, wherein the plurality of coils are arranged in parallel in the direction of a coordinate axis.

4. The method as claimed in claim 3, wherein the first set of coils consists of every other of the plurality of coils.

5. The method as claimed in claim 4, wherein the first set of coils and the third set of coils comprise the same coils.

6. The method as claimed in claim 1, wherein the step of detecting an interaction between the first set of coils and the first position indicator comprises the substeps of defining a plurality of areas on the surface of the sensor unit and identifying an area indicated by the first position detector.

7. The method as claimed in claim 6, wherein the second set of coils consist of the coils in the area indicated by the first position detector.

8. The method as claimed in claim 7, wherein the first set of coils and the third set of coils comprise the same coils.

9. The method as claimed in claim 7, wherein the plurality of coils are arranged in parallel in the direction of a coordinate axis.

10. The method as claimed in claim 9, wherein the first set of coils consists of every other of the plurality of coils.

11. The method as claimed in claim 10, wherein the first set of coils and the third set of coils comprise the same coils.

12. The method as claimed in claim 1, further comprising the steps of:
   indicating an interaction between the third set of coils and the second position indicator;
   designating a fourth set of coils based upon the detected interaction between the third set of coils and the second position indicator; and
   scanning the fourth set of coils for the second position indicator and detecting an interaction between the fourth set of coils and the second position indicator.

13. The method as claimed in claim 7, further comprising the steps of:
   indicating an interaction between the third set of coils and the second position indicator;
   designating a fourth set of coils based upon the detected interaction between the third set of coils and the second position indicator; and
   scanning the fourth set of coils for the second position indicator and detecting an interaction between the fourth set of coils and the second position indicator;
   wherein the step of detecting an interaction between the third set of coils and the second position indicator comprises the substeps of defining a plurality of areas on the surface of the sensor unit and identifying the area indicated by the second position detector; and
   wherein the fourth set of coils consist of the coils in the area indicated by the second position detector.

14. The method as claimed in claim 1, further comprising the steps of repetitively scanning the second set of coils and the third set of coils, wherein the second set of coils is scanned more frequently than the third set of coils.

15. The method as claimed in claim 14, wherein the relative frequency of scanning the second and third sets of coils may be changed.

16. The method as claimed in claim 13, further comprising the steps of repetitively scanning the second and fourth sets of coils.

17. The method as claimed in claim 6, wherein the second and fourth sets of coils are alternativly scanned.

18. The method as claimed in claim 16, wherein the second set of coils is scanned more frequently than the third set of coils, and wherein the first position indicator requires closer tracking than the second position indicator.

19. The method as claimed in claim 18, wherein the relative frequency of scanning the second and third sets of coils may be changed.

20. A method for detecting the position of a first position indicator and a second position indicator on the surface of a sensor unit, the sensor unit comprising a plurality of conductive coils arranged in the same plane as the surface, a means for scanning the coils, and a means for detecting an interaction between the coils and the first position indicator and between the coils and the second position indicator, the method comprising the steps of:

scanning the entire surface for the first position indicator and detecting an interaction between the first position indicator and the coils;

scanning a portion less than the entire surface for the first position indicator, the portion being selected based upon the detected interaction between the first position indicator and the coils; and scanning the entire surface for the second position indicator.

21. The method as claimed in claim 20, further comprising the steps of repetitively scanning a portion less than the entire surface for the first position indicator and scanning the entire surface for the second position indicator.

22. The method as claimed in claim 21, wherein the step of scanning a portion less than the entire surface for the first position indicator occurs more frequently than the step of scanning the entire surface for the second position indicator.

23. The method as claimed in claim 20, further comprising the steps of detecting an interaction between the second position indicator and the coils and scanning a portion less than the entire surface for the second position indicator, the portion being selected based upon the detected interaction between the second position indicator and the coils.

24. The method as claimed in claim 23, further comprising the steps of repetitively scanning the portion less than the entire surface for the first position indicator and scanning the portion less than the entire surface for the second position indicator, wherein the scanning of the portion less than the entire surface for the first position indicator occurs more frequently than the scanning of the portion less than the entire surface for the second position indicator.

25. The method as claimed in claim 24, wherein the relative frequency of scanning the portion less than the entire surface for the first position indicator and scanning the portion less than the entire surface for the second position indicator may be changed.

26. A method for detecting the position of a first position indicator responsive to a first frequency and a second position indicator responsive to a second frequency on the surface of a sensor unit, the sensor unit comprising a plurality of conductive coils arranged in the same plane as the surface, a means for scanning the coils, and a means for detecting an interaction between the coils and the first position indicator and between the coils and the second position indicator, the method comprising the steps of:

scanning the entire surface for the first position indicator;

scanning the entire surface for the second position indicator; and repeating the scan of the entire surface for the first position indicator and the scan of the entire surface for the second position indicator, wherein the scan of the entire surface area for the first position indicator occurs more often than the scan of the entire surface area for the second position indicator.

27. The method as claimed in claim 26, wherein the first position indicator requires closer tracking than the second position indicator.

28. The method as claimed in claim 27, wherein the relative frequency of scanning the entire surface for the first position indicator and scanning the entire surface for the second position indicator may be changed.

29. A sensor unit for detecting the position of a first position indicator and a second position indicator on the surface of a sensor unit, the sensor unit comprising:

a plurality of conductive coils; and a means for scanning the coils and for detecting an interaction between the coils and the first position indicator and between the coils and the second position indicator, said means comprising:

means for designating a first set of coils;

means for scanning the first set of coils for the first position indicator and detecting an interaction between the first set of coils and the first position indicator;

means for designating a second set of coils based upon the detected interaction between the first set of coils and the first position indicator;

means for scanning the second set of coils for the first position indicator and detecting an interaction between the second set of coils and the first position indicator;

means for designating a third set of coils; and means for scanning the third set of coils for the second position indicator.

30. The sensor unit as claimed in claim 29, wherein the first set of coils and the third set of coils comprise the same coils.

31. The sensor unit as claimed in claim 29, wherein the plurality of coils are arranged in parallel in the direction of a coordinate axis.

32. The sensor unit as claimed in claim 31, wherein the first set of coils consists of every other of the plurality of coils.

33. The sensor unit as claimed in claim 32, wherein the first set of coils and the third set of coils comprise the same coils.

34. The sensor unit as claimed in claim 29, wherein the step of detecting an interaction between the first set of coils and the first position indicator comprises the substeps of defining a plurality of areas on the surface of the sensor unit and identifying the area indicated by the first position detector.

35. The sensor unit as claimed in claim 30, wherein the second set of coils consist of the coils in the area indicated by the first position detector.

36. A sensor unit for detecting the position of a first position indicator and a second position indicator on the surface of a sensor unit, the sensor unit comprising:

a plurality of conductive coils; and a means for scanning the coils and for detecting an interaction between the coils and the first position indicator and between the coils and the second position indicator, said means comprising:

means for scanning the entire surface for the first position indicator; and means for scanning the entire surface for the second position indicator; and wherein the scan of the entire surface for the first position indicator and the scan of the entire surface for the second position indicator are repeated, and wherein the scan of the entire surface area for the first position indicator occurs more often than the scan of the entire surface area for the second position indicator.

37. The sensor unit as claimed in claim 36, wherein the first position indicator requires closer tracking than the second position indicator.

* * * * *